Patented Apr. 17, 1934

1,955,052

UNITED STATES PATENT OFFICE 1,955,052

INSECTICIDAL, FUNGICIDAL AND BACTERICIDAL COMPOSITIONS

Arthur W. Burwell, Niagara Falls, N. Y., assignor to Alox Chemical Corporation, New York, N. Y., a corporation of New York No Drawing. Application May 8, 1933,
Serial No. 670,031

5 Claims. (Cl. 167—22)

The present invention relates to the provision of compositions having insecticidal, fungicidal, and bactericidal properties, and is concerned more particularly with the provision of a method of, and means for, combating infectious organisms involving the application of dispersions, in liquid media, of compositions consisting essentially of, or comprising, salts of certain synthetic fatty acids hereinafter more fully described.

It has been found that dispersions in liquid media, of certain organic compositions consisting essentially of soaps of fatty acids obtained from petroleum hydrocarbons by controlled, liquid phase, partial oxidation thereof, possess a high toxicity to organisms occasioning bacterial infection and/or fungus growth in or upon the skin of animals including man, and likewise possess a high toxicity to plant insects, including especially plant lice, when applied to the skin surfaces, scalp, or the like of animals or when applied to plant foliage or to the bark or woody parts of trees, while possessing a desirably low toxicity to the plants and/or trees and substantial lack of irritating effect or toxic effect toward animal (e. g., human) skin so treated.

The said organic compositions forming the basis of the invention are in general prepared by contacting an oxidizing gas, such as air or oxygen-enriched air, with a body of petroleum hydrocarbon mixture which may consist of normally solid petroleum waxes such as "Sharples wax", rod wax or the like, or of normally liquid petroleum distillates either light or heavy, or of mixtures thereof, in liquid phase and at a temperature higher than normal room temperature but not above 155° C. and at a superatmospheric pressure of from 150 to 350 pounds per square inch—say, 250 pounds per square inch—in the presence of a promoter of oxidation which may consist of a known oxidation catalyst such as, for instance, an organic salt of manganese, e. g., manganese oleate in an amount equal to about 0.1 per cent of the charge, or of unsaponifiable oxygen compounds of hydrocarbons derived as by-products from a like oxidation in an amount up to 50 per cent of the charge, or both, the oxidation treatment being continued until incipient precipitation of compounds insoluble in the reaction mixture is indicated in a test sample of the body, and treating the resulting reaction mixture with caustic alkali, or an equivalent saponifying agent, in amount sufficient to saponify all the saponifiable constituents of the reaction mixture, with or without an optional final operation consisting in the separation from the alkali-treated mixture of unsaponified substances. Preferably the alkali treating step is carried out in the following manner.

The reaction mixture comprises a large number of different compounds including unoxidized hydrocarbons, unsaponifiable, e. g., alcoholic and ketonic, oxidation products of hydrocarbons whose oxidation has not proceeded sufficiently far for the said products to be converted into acids, and acidic compounds having the chemical constitution of saturated aliphatic monocarboxylic acids which are soluble in hydrocarbons, including petroleum hydrocarbons, and in general soluble in oils and fats. Of these acids, those of lower molecular weights (e. g., those of from 4 to 10 carbon atoms to the molecule) show some solubility in water, the relative solubility decreasing with increase in molecular weight; the acids of higher molecular weights are relatively insoluble in water. The said acids, then, may be characterized as having a relatively highly hydroxylated, ketonic, constitution. In general, they contain from 4 to, say, 15 carbon atoms to the molecule with an average of about 8 carbon atoms to the molecule. They are, in general, normally liquid at ordinary room temperature. Their alkali salts are readily soluble or at least emulsifiable in water. Their alkali (e. g., sodium) salts, in 20% solution are, in general, liquid at temperatures of 37° C. and above (depending somewhat upon the characteristics of their hydrocarbonaceous source, those derived from normally liquid sources being either quite soft or, if containing a relatively very small amount of water, liquid at 37° C. and above, while those derived from waxes tend to have somewhat lower softening points), appearing as a dark brown liquid: when cooled very rapidly a light brown to tan mass forms as a top layer with the underlying liquid layer dark; if, however, the salts are cooled slowly and agitated during the cooling they appear as a viscous light brown mass with no visible liquid portion.

To the whole reaction mass there is added and thoroughly admixed therewith, with or without first preliminarily treating the reaction mixture for the removal of compounds of the order of formic acid, a sufficient amount of an aqueous solution of an alkali, such, for instance, as caustic soda, to insure complete saponification of the saponifiable constituents, care being taken to not unduly dilute the mixture with water, and the mixture is allowed to settle. There are thereby formed two immiscible layers: the supernatant layer is oily, and consists of unoxidized hydrocarbons and unsaponified oxygen compounds of hydrocarbons; while the subnatant layer is aqueous and soapy, and comprises the alkali salts of the aforesaid acids together with a material amount of non-acidic and unsaponifiable oxidized compounds (mainly ketonic in constitution) which tenaciously associate with the said acids and/or their salts and from which latter they can be wholly separated only with great difficulty. This subnatant layer appears to be an emulsion of these unsaponifiable oxidation products in the aqueous solution of the said salts (soaps). The supernatant layer is drawn off, and may serve as oxidation-promoter in a subsequent charge of starting material.

The subnatant layer, which comprises or contains the basis of my bactericidal, fungicidal and insecticidal composition, may be dispersed in a suitable liquid medium for direct use; it may, however, be dehydrated as, for example, by subjecting it to evaporation treatment at a temperature of from about 120° to about 150° C. in the presence or absence of added petroleum hydrocarbons to assist in the dehydration. Likewise, the fatty acid salt content of the composition may be increased by separating therefrom at least the major proportion of unsaponifiable bodies including particularly compounds of ketonic constitution which tenaciously associate with the saponified compounds. For effecting this separation the following procedure is preferred: With the hereinbefore described subnatant aqueous layer there is thoroughly admixed a solvent for the unsaponifiable bodies which solvent is immiscible with water, such, for instance, as a petroleum oil distillate, for example a 36–40° Baumé distillate, in a suitable amount which may equal in volume that of the aqueous layer, and the mixture is allowed to settle. Thereupon the mixture separates into two layers, the supernatant oily layer containing the said solvent and at least the major proportion of the unsaponifiable bodies theretofore associated with the saponified compounds, and the subnatant layer containing the aforesaid soaps and at most a minor proportion of the aforesaid unsaponifiable bodies.

Dispersions, that is to say, solutions or emulsions of high insecticidal value and suitable for spraying upon vegetable growth, are prepared by dissolving or thoroughly admixing with 100 parts by weight of liquid medium, e. g., water, the aforesaid dehydated soap, in an amount equalling from 0.1 to 1.0 part by weight, say, 0.5 part by weight, or the aforesaid alkali-treated reaction mixture, in effectively equivalent amount. I may incorporate in such solutions or emulsions substances exerting a fungicidal effect or exerting an insecticidal effect supplementing that of the said soaps. The liquid medium may consist of an oil, e. g., a petroleum distillate, such as "kerosene", or of water, or of both.

A large number of compositions prepared from various petroleum hydrocarbon mixtures by the process hereinbefore described have been tested, including compositions prepared from (a) a petroleum fraction supposed to be commercially pure decane and sold under the trade-name of "Varnolene"; (b) a 45° Baumé distillate; (c) a 36–40° Baumé distillate; (d) tar still distillates ranging from 31° to 28° Baumé; (e) white wax; and (f) "Sharples" wax. These compositions possess, in common, high insecticidal, bactericidal and fungicidal power and low toxicity to animals and to vegetable growth. In the case of an insecticidal composition prepared by oxidizing a 36–40° Baumé petroleum distillate, saponifying the saponifiable constituents of the reaction mass with caustic soda solution, drawing off the supernatant oily layer, and separating at least the major proportion of associated unsaponifiable (ketonic) bodies from the soaps in the subnatant aqueous layer by treatment with an immiscible solvent, yielding a clear wine-colored solution, an aqueous insecticidal spray containing 0.5 per cent of the said soap showed, in a single application, a mortality on live San Jose lice of from 96 to 98%, two applications thereof making a practically complete kill. Single applications of the compositions, in spray form, have been found to be so effective against scale in the dormant state that the insects were entirely exterminated in two successive years.

Under certain conditions it may be found desirable to use the aforesaid fatty acid compounds in the form of unstable, or readily decomposable, salts; for example, ammonium compounds thereof. Thus, I may use a dispersion, in a liquid medium, of the ammonium soap which readily parts with ammonia, leaving active free fatty acids.

It has been found, further, that the aforesaid salts (or, more properly, the solids contents of the aforesaid subnatant layers) possess several attributes which render them adapted for use in the treatment of certain skin diseases. They are, while highly dispersive and penetrative, non-irritating and definitely softening to the skin. They lower the surface tension of water. They exert a gentle exfoliating effect on skin surfaces to which they are applied, this attribute being especially desirable in the treatment of diseases of the type of psoriasis. Laboratory and clinical results established that the said salts, dissolved or emulsified in water to form about a 20% solution or emulsion, are toxic to a considerable number of species of fungi and bacteria. Thus, such salts have been found to have beneficial results in the treatment of psycosis, psoriasis, ringworm of all types, eczemas of all types and pustular infections.

Illustrating the laboratory results obtained by the use of the aforesaid salts is the following: To cultures of B. coli in an appropriate culture medium (broth) were added solutions of the salts in varying concentrations. The solutions of the salts being denser than the broth, a good admixture of bacteria and agent was obtained. These tests were then incubated at normal room temperature, the results being as follows:

| Organism: B. coli | Agent: Alkali salts of the synthetic fatty acids | | | | | | | | |
|---|---|---|---|---|---|---|---|---|---|
| | Percentage of salts | | | | | | | | |
| Time | 18 | 16 | 14 | 12 | 10 | 8 | 6 | 4 | 2 |
| 10 minutes | | | | | Growth | Growth | Growth | Growth | Growth |
| 30 minutes | | | | | | 90 hr. inhibition. | do | do | Do. |
| 60 minutes | | | | | | | do | do | Do. |
| 20 hours | | | | | | | | do | Do. |

Results of companion tests, incubated at 37.0° C. instead of at room temperature, evidenced more pronounced toxic effect of the salts at body temperature.

Laboratory tests performed to determine the fungicidal value of the salts showed that the latter was toxic to, inter alia, the following organisms at body temperature, at the following concentrations or above:

|  | Percent |
|---|---|
| Trichophyton gypseum | 8 |
| Trichophyton interdigitale | 19.5 |
| Trichophyton violaceum | 19.5 |
| Trichophyton rubrum | 19.5 |
| Pink monilia | 8 |
| Microsporon lanosum | 8 |
| Epidermophyton | 14 |
| Trichophyton ectothrix | 8 |
| Microsporon audouini | 8 |

In preparing the aforesaid salts for bactericidal and/or fungicidal uses, I have found that the relative effectiveness of the resulting products may, to some extent, be modified by varying the relative proportion of alkaline salt-forming reagent to acid. Thus, I may so proportion the alkaline reagent that the resulting product is definitely alkaline, or that it is neutral or that it is slightly acid. My researches indicate that the most uniform results and the greatest efficacy are obtained by so proportioning the alkaline agent to the acid that the reaction product is just neutral to phenolphthalein, in water, but slightly acid in alcoholic medium; these products show an acidity equivalent to a hydrogen ion concentration represented by a pH of from 4 to 5.5.

Moreover, I have found that there may be a difference in germicidal activity between different salts depending upon the relative molecular weights of the acids from which they are produced, and that this difference is not a straight line function of relative molecular weight. Thus, I examined the sodium salts produced from three different distillation fractions of a single acidic mixture derived from oxidized petroleum distillate, the fractions being identified as follows:

1st fraction boiling between 190 and 200°
2nd fraction boiling between 230 and 240°
3rd fraction boiling between 270 and 280°

I found that while the salts produced from the 1st and 3rd fractions had a germicidal activity of 1 to 800 (F. D. A. Phenol Coefficient Method), the salts produced from the 2nd fraction (which had an equivalent weight of 184) had a germicidal activity of 1 to 2200.

This application contains subject matter common to the subject matter of application Serial No. 485,559, filed by Arthur W. Burwell on September 30, 1930, for "Insecticidal compositions and process", and therefore is to be considered as a continuation-in-part thereof.

I claim:

1. An insecticidal, bactericidal and fungicidal composition comprising in liquid dispersion an organic composition consisting essentially of a mixture of alkali salts of saturated aliphatic monocarboxylic non-aldehydic acid oxidation products of petroleum hydrocarbons, said acid oxidation products having in general from 4 to 15 carbon atoms to the molecule and being normally liquid at ordinary room temperature.

2. An insecticidal, bactericidal and fungicidal composition as defined in claim 1, in which the salts are sodium salts.

3. An insecticidal, bactericidal and fungicidal composition as defined in claim 1, in which the salts are ammonium salts.

4. An insecticidal, bactericidal and fungicidal composition comprising an organic composition consisting essentially of a mixture of salts of saturated aliphatic monocarboxylic hydroxylated ketonically-constituted acid oxidation products of petroleum hydrocarbons, said acid oxidation products having in general from 4 to 15 carbon atoms to the molecule and being normally liquid at ordinary room temperature.

5. An insecticidal, bactericidal and fungicidal composition comprising in liquid dispersion an organic composition consisting essentially of a mixture of alkali salts of saturated aliphatic monocarboxylic hydroxylated ketonically-constituted acid oxidation products of petroleum hydrocarbons, said acid oxidation products having in general from about 4 to about 15 carbon atoms to the molecule and being normally liquid at ordinary room temperature, said salts being accompanied by a material amount of non-acidic unsaponifiable generally ketonic oxidized compounds of petroleum hydrocarbons.

ARTHUR W. BURWELL.